United States Patent [19]
Kato

[11] Patent Number: 5,870,994
[45] Date of Patent: Feb. 16, 1999

[54] INTAKE AIR CONTROL APPARATUS FOR ENGINES

[75] Inventor: Senji Kato, Aichi-ken, Japan

[73] Assignee: Toyota Jidosha Kabushiki Kaisha, Toyota, Japan

[21] Appl. No.: 920,175

[22] Filed: Aug. 25, 1997

[30] Foreign Application Priority Data

Aug. 26, 1996 [JP] Japan .................................. 8-223969

[51] Int. Cl.$^6$ .................................................. F02D 41/08
[52] U.S. Cl. ...................................................... 123/339.15
[58] Field of Search ........................... 123/339.15, 90.15

[56] References Cited

U.S. PATENT DOCUMENTS 5,080,061  1/1992  Nishimura .......................... 123/339.15

FOREIGN PATENT DOCUMENTS

| 41 26 369 | 2/1993 | Germany | 123/339.15 |
| 60-93142 | 5/1985 | Japan | 123/339.15 |
| 62-82250 | 4/1987 | Japan | 123/339.15 |
| 1-110844 | 4/1989 | Japan . | |
| 2-233846 | 9/1990 | Japan | 123/339.15 |
| 3-70098 | 3/1991 | Japan . | |
| 7-119526 | 5/1995 | Japan . | |

*Primary Examiner*—Erick R. Solis
*Attorney, Agent, or Firm*—Kenyon & Kenyon

[57] ABSTRACT

An improved apparatus is provided to control supply of airflow to an engine. The engine includes a combustion chamber connected to an air intake passage and an air exhaust passage. An air intake valve selectively opens and closes the intake passage to control the supply of the airflow to the combustion chamber. An air exhaust valve selectively opens and closes the exhaust passage to control the discharge of the exhaust gas from the combustion chamber. An altering device alters a period of an overlap of the valves by changing a valve timing of valves. A first detector detects a driving state of the engine. An ECU computes a target valve timing based on the detected driving state of the engine controls the altering device based on the computed target valve timing. An adjusting device is arranged in the intake passage to adjust the supply of the airflow to the combustion chamber. The ECU computes a target amount of the airflow to be supplied to the engine in an idling state. The ECU detects the period of the valve overlap. The ECU computes a correction value to correct the target amount of the air based on the detected period of the valve overlap. The correction value is continuously variable based on the period of the valve overlap. The ECU corrects the target amount based on the correction value by increasing the target amount by the correction value and controls the adjusting means based on the corrected target amount.

16 Claims, 13 Drawing Sheets

INTAKE AIR CONTROL APPARATUS FOR ENGINES

BACKGROUND OF THE INVENTION

1. FIELD OF THE INVENTION

The present invention relates to an apparatus that controls an engine by varying the valve timing of at least either one of an intake valve and an exhaust valve while adjusting the amount of intake air supplied to the engine.

2. DESCRIPTION OF THE RELATED ART

In a typical engine, an intake passage and an exhaust passage, which are communicated with a combustion chamber, are selectively opened and closed by an intake valve and an exhuast valve, respectively. The intake valve is driven by an intake camshaft while the exhaust valve is driven by an exhuast camshaft. The intake and exhaust camshafts rotate synchronously with a crankshaft. Accordingly, the opening and closing timing of the valves, or the valve timing, is determined by the rotational phase of the crankshaft.

There are various types of apparatus that change the valve timing of the intake and exhaust valves in accordance with the operating state of the engine. A typical apparatus is provided with a variable valve timing (VVT) mechanism for changing the valve timing and a computer for controlling the VVT mechanism. The computer controls the VVT mechanism in accordance with the operating state of the engine to vary the valve timing to a target timing. Furthermore, when the valve timing is varied, the period of time during which both intake and exhaust valves are opened, that is, the valve overlap, is also changed.

Changes in the valve timing and the valve overlap optimizes the amount of air-fuel mixture drawn into the combustion chamber, the amount of exhaust gas discharged from the combustion chamber, the discharge timing of the exhaust gas, and the amount of residual exhaust gas in the combustion chamber, or the amount of internal gas recirculation (EGR). This increases engine power and improves fuel emissions and fuel efficiency.

However, when the VVT mechanism fails to function, the actual valve timing becomes different from the target valve timing. This may result in various problems.

For example, if the timing mechanism fails when the valve overlap is long, the increase in the amount of internal EGR decreases the amount of air included in the air-fuel mixture that is sent to the combustion chamber. This causes the amount of air drawn into the combustion chamber to become insufficient and hinders normal combustion. As a result, the fuel efficiency becomes low and the engine emissions becomes undesirable.

An insufficient amount of air may cause the engine to stall especially if the load of the engine is low such as when the engine is idling. The amount of fuel drawn into the combustion chamber for combustion is small when the engine load is low. Thus, in such state, combustion tends to become unstable. An increase in the amount of internal EGR further amplifies the unstable combustion.

A control apparatus that prevents such engine stalls has been proposed in the prior art. As shown in FIG. 15, the control apparatus is applied to an engine 200, which has a crankshaft 201, an intake camshaft 202 for driving a suction valve (not shown), and an exhaust camshaft 203 for driving an exhaust valve (not shown). Pulleys 204, 205, 206 are provided on the ends of the shafts 201, 202, 203, respectively, and connected to one another by a timing belt 207.

The control apparatus includes a VVT mechanism 211, which shifts the valve timing of the intake valve, and a computer 212, which controls the VVT mechanism 211. The VVT mechanism 211 is provided with a control plate 208, which rotates relatively to an intake camshaft 202, an actuator 210, which rotates the control plate 208, and a link 209, which connects the actuator 210 and the control plate 208. The actuator 210 rotates the control plate 208 about the intake camshaft 202 with the link 209.

When the engine 200 is idling, the computer 212 controls the actuator 210 to rotate the rotate the control plate 208 counterclockwise to a position shown in FIG. 16(a). This position is hereafter referred to as the idling position. The rotation of the control plate 208 retards the valve timing of the intake valve and causes the valve overlap to become shorter.

When the load of the engine 200 is high, the computer 212 controls the actuator 210 to rotate the control plate 208 clockwise to a position shown in FIG. 16(b). This position is hereafter referred to as the high load position. The rotation of the control plate 208 advances the valve timing of the intake valve and causes the valve overlap to become longer.

Accordingly, the control apparatus enables the valve timing of the intake valve and the valve overlap to be shifted between two conditions.

Furthermore, as shown in FIG. 15, the engine 200 is provided with an intake manifold 213. A surge tank 214 and an intake pipe 215 are further provided at the upstream side of the intake manifold 214. A throttle valve 216 is arranged in the intake pipe 215. The throttle valve 216 adjusts the amount of air that is drawn into the combustion chamber (not shown) by way of the intake pipe 215, the surge tank 214, and the intake manifold 213.

The intake pipe 215 is provided with a bypass 217. The bypass 217 connects the upstream side of the throttle valve 216 to the downstream side of the throttle valve 216. An idle speed control valve (ISCV) 218 is arranged in the bypass 217. When the throttle valve 216 is completely closed during idling of the engine 200, the ISCV 218 adjusts the speed of the engine 200 by adjusting the amount of air flowing through the bypass 217.

When the engine 200 shifts to an accelerating state from an idling state, the computer 212 controls the ISCV 218 and increases the opening of the ISCV 218. Thus, engine stalls caused by an insufficient amount of intake air is prevented even if the VVT mechanism 211 fails to function when the engine 200 returns to an idling state.

The amount of air tends to become insufficient due to an increase in the amount of internal EGR if the VVT mechanism 211 fails to function when the control plate 208 is located at the high load position. Therefore, to positively prevent engine stalls, it is necessary to set the increase amount of the opening of the ISCV 218 under the assumption that the VVT mechanism 211 fails to function when the control plate 218 is located at the high load position.

However, if the increase amount of the opening of the ISCV 218 is determined assuming that the VVT mechanism 211 fails when the control plate 208 is located at the high load position, excessive air is drawn into the combustion chamber by way of the bypass 217 when the engine 200 shifts from an idling state to an accelerating state. This may suddenly increase the output torque of the engine 200 and degrade driveability. This may also decrease the effectiveness of the engine brake.

Engine stalls may be prevented by detecting abnormalities of the VVT mechanism 211 and increasing the opening of the ISCV 218 when detecting abnormalities. If the VVT mechanism 211 functions normally, excessive air is not drawn into the engine 200 when the engine 200 shifts from an idling state to an accelerating state.

However, a certain amount of time is necessary to detect abnormalities of the VVT mechanism 211. This delays the response of the VVT mechanism 211. Thus, the engine 200 may stall when shifted from an idling state to an accelerating state during the period between when an abnormality actually occurs and when the abnormality is detected.

SUMMARY OF THE INVENTION

Accordingly, it is an objective of the present invention to provide an apparatus that prevents engine stalls caused by abnormalities or response delays of the valve timing control without excessively increasing the intake air amount.

To achieve the above objective, the present invention provides an apparatus for controlling supply of airflow to an engine. The engine includes a combustion chamber connected to an air intake passage and an air exhaust passage, an air intake valve selectively opening and closing the air intake passage to control the supply of the airflow to combustion chamber, an air exhaust valve selectively opening and closing the air exhaust passage to control the discharge of the exhaust gas from the combustion chamber, altering means for altering a period of an overlap of the air intake valve and the air exhaust valve by changing a valve timing of at least one of the air intake valve and the air exhaust valve, first detecting means for detecting a driving state of the engine, first computing means for computing a target valve timing based on the detected driving state of the engine, and first control means for controlling the altering means based on the computed target valve timing. The apparatus includes adjusting means arranged in the air intake passage to adjust the supply of the airflow to the combustion chamber, second computing means for computing a target amount of the airflow to be supplied to the engine in an idling state, second detecting means for detecting the period of the valve overlap, third computing means for computing a correction value to correct the target amount of the air based on the detected period of the valve overlap, the correction value being continuously variable based on the period of the valve overlap, correction means for correcting the target amount based on the correction value, correction means increasing the target amount by the correction value, and second control means for controlling the adjusting means based on the corrected target amount.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 4 is a block diagram showing the structure of the

DETAILED DESCRIPTION OF THE PREFERRED EMBODIMENTS

A first embodiment of a control apparatus according to the present invention that is applied to a gasoline engine for vehicles will now be described with reference to the drawings.

Figure 1:
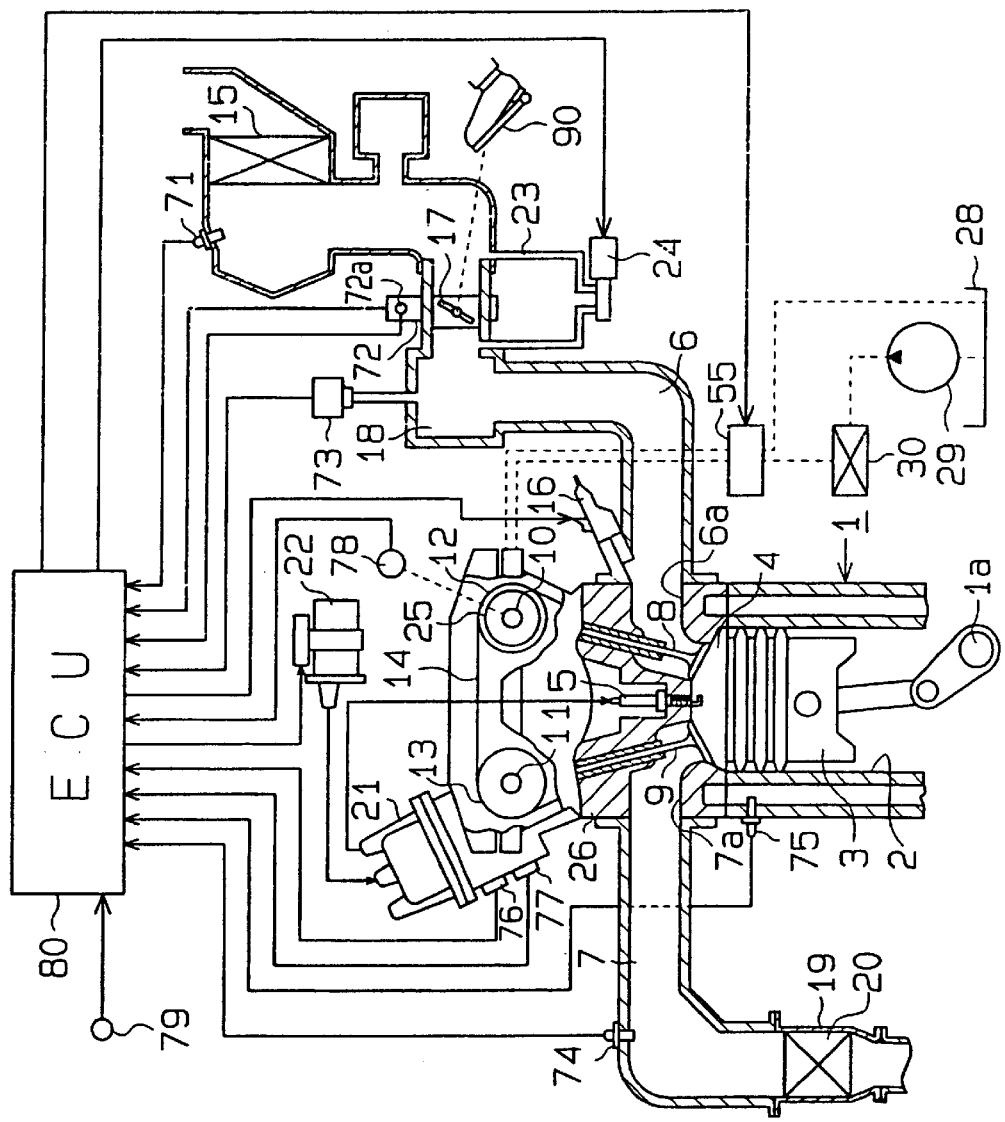
FIG. 1 is a diagrammatic view showing a gasoline engine system in which a first embodiment according to the present invention is employed.

A schematic view of a gasoline engine system is shown in FIG. 1. A gasoline engine 1 is provided with a plurality of cylinders 2. A piston 3 is accommodated in each cylinder 2 and connected to a crankshaft 1*a*. A combustion chamber 4 is defined in each cylinder 2 above the piston 3. An ignition plug 5 is provided for each combustion chamber 4 to ignite the drawn in air-fuel mixture.

An intake passage 6 and an exhaust passage 7, which are communicated with each combustion chamber 4, are connected to the engine 1. An intake port 6*a*, which constitutes part of the intake passage 6, and an exhaust port 7*a*, which constitutes part of the exhaust passage 7, are provided for each cylinder 4. An intake valve 8 is provided for each intake port 6*a* while an exhaust valve 9 is provided for each exhaust port 7*a*. The intake and exhaust valves 8, 9 selectively open and close the associated ports 6*a*, 7*a* and are driven by the rotation of different camshafts 10, 11, respectively. A timing pulley 12 is provided at the distal end of the camshaft 10 while a timing pulley 13 is provided at the distal end of the camshaft 11. The pulleys 12, 13 are connected to the crankshaft la by means of a timing belt 14.

The rotating force of the crankshaft 1*a* is transmitted to the camshafts 10, 11 by means of the timing belt 14 and the timing pulleys 12, 13. The rotation of the camshafts 10, 11 drive the associated valves 8, 9. The valves 8, 9 are synchronized with the rotation of the crankshaft 1*a*. In other words, the valves 8, 9 are synchronized with the intake, compression, power, and exhaust strokes that correspond to the reciprocation of each piston 3.

An air cleaner 15 is provided at the upstream side of the intake passage 6 to clean the air that is drawn into the passage 6. An injector 16 is provided for each combustion chamber 4 and arranged in the vicinity of the associated intake port 6a to inject fuel toward the port 6a. The air drawn into the intake passage 6 is mixed with fuel that is injected from the injector 16. The air-fuel mixture is drawn into the combustion chamber 4 when the associated intake valve 8 opens the intake port 6a during the intake stroke. The air-fuel mixture is then ignited by the associated ignition plug 5 and burned in the combustion chamber 4. The combustion of the air-fuel mixture in the compression chamber 4 drives the associated piston 3 and rotates the crankshaft 1a. This produces power of the engine 1.

The burned gas is exhausted externally from the compression chamber 4 through the exhaust passage 7 when the associated exhaust valve 9 opens the exhaust port 7a. The exhausted gas is purified by a catalytic converter 19, which is arranged in the exhaust passage 7.

A throttle valve 17 arranged in the intake passage 6 is operated in correspondence with the manipulation of an acceleration pedal 90. The amount of air drawn into the combustion chambers 4, or the intake air amount GA, is adjusted by the angle of the throttle valve 17. A surge tank 18 is arranged at the downstream side of the throttle valve 17 to decrease pulsation of the intake air.

An intake air temperature sensor 71 is provided at the vicinity of the air cleaner 15 to detect the temperature of the intake air and output a signal corresponding to the detected value. A throttle sensor 72 is provided at the vicinity of the throttle valve 17 to detect the angle of the throttle valve 17, or the throttle angle TA, and output a signal corresponding to the detected value. The throttle sensor 72 incorporates an idle switch 72a. The idle switch 72a outputs an idle switch signal IDS that is set at ON when the throttle valve 17 completely closes the intake passage 6 during idling of the engine 1. An intake pressure sensor 73 is provided in the surge tank 18 to detect the intake air pressure in the surge tank 18, or the intake pressure PM, and output a signal corresponding to the detected value. An oxygen sensor 74 is provided in the exhaust passage 7 to detect the oxygen concentration Ox of the exhaust gas and output a signal corresponding to the detected value. A coolant temperature sensor 75 is provided in the engine 1 to detect the temperature of the engine coolant, or the coolant temperature THW, and output a signal corresponding to the detected value.

A distributor 21 distributes high voltage, which is output from an ignitor 22, to the ignition plugs 5. The ignition timing of the ignition plugs 5 is determined by the output timing of the high voltage from the distributor 21. The distributor 21 incorporates a rotor (not shown) that rotates together with the camshaft 11. A speed sensor 76 is provided in the distributor 21 to detect the engine speed NE based on the rotation of the rotor and output a signal corresponding to the detected value. A cylinder distinguishing sensor 77 is provided in the distributor 21 to detect a reference position in the rotational direction of the crankshaft 1a and output a pulse signal corresponding to the detected value.

A cam sensor 78 is provided for the camshaft 10 to output a signal corresponding to the rotational angle of the camshaft 10. The actual camshaft displacement angle VT is detected based on the signals from the cam sensor 78, the cylinder distinguishing sensor 77, and the speed sensor 76. An air-conditioner switch 79 of an air-conditioning apparatus (not shown) outputs an air-conditioner switch signal SW that corresponds to the ON/OFF state of the apparatus.

A bypass 23 is provided in the intake passage 6 to connect the upstream side of the throttle valve 17 with the downstream side of the throttle valve 17. A linear solenoid type idle speed control valve (ISCV) 24 is provided on the bypass 23. The ISCV 24 adjusts the intake air amount GA drawn into the combustion chambers 4 to adjust the engine speed NE.

A hydraulic drive type variable valve timing (VVT) mechanism 25 is provided on the camshaft 10, which drives the intake valves 8. The VVT mechanism 25 varies the valve timing of the intake valves 8. A hydraulic mechanism used to drive the VVT mechanism 25 will now be described.

Figure 2:
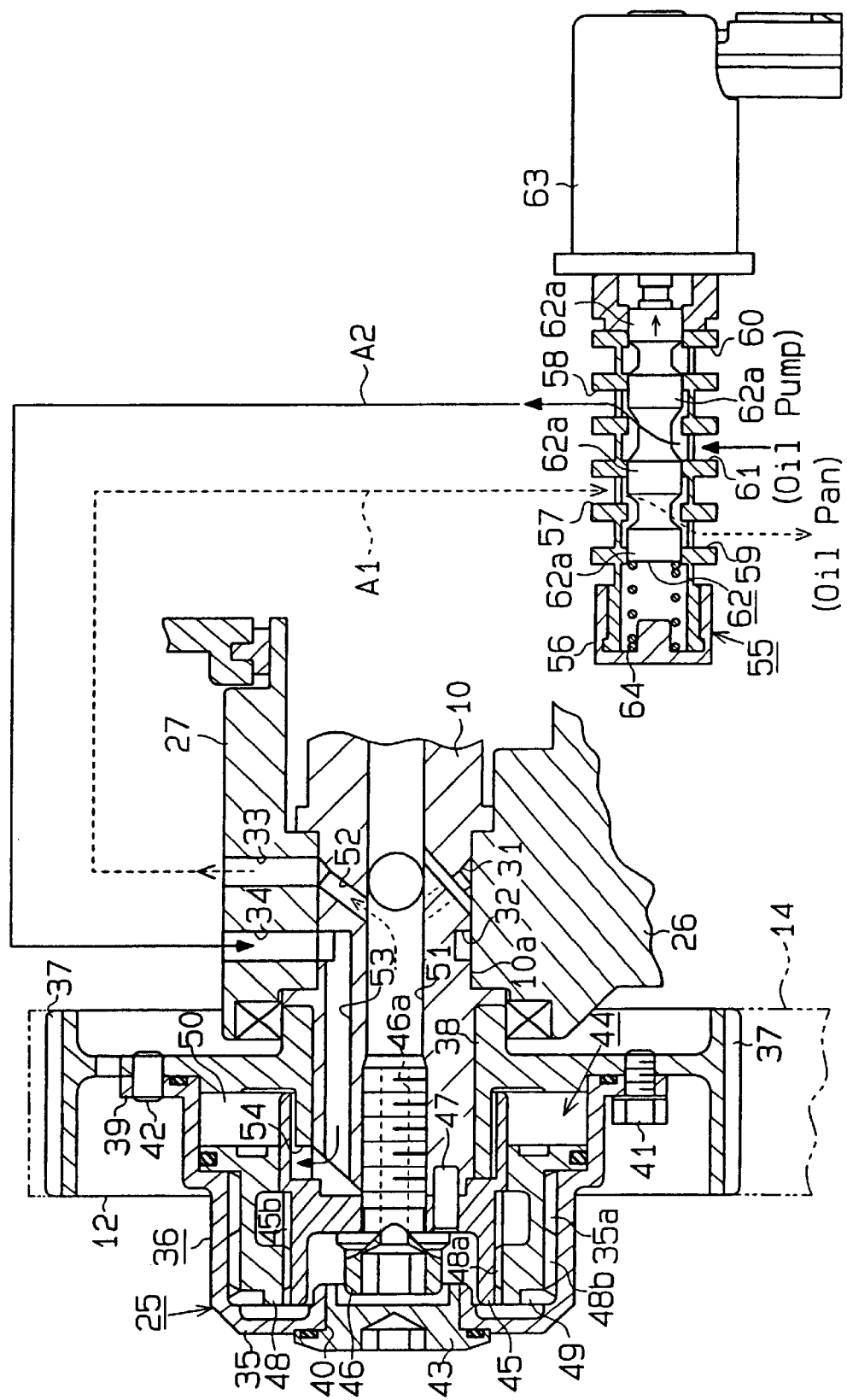
FIG. 2 is a cross-sectional view showing the structures of the VVT mechanism and the LSV.
Figure 3:
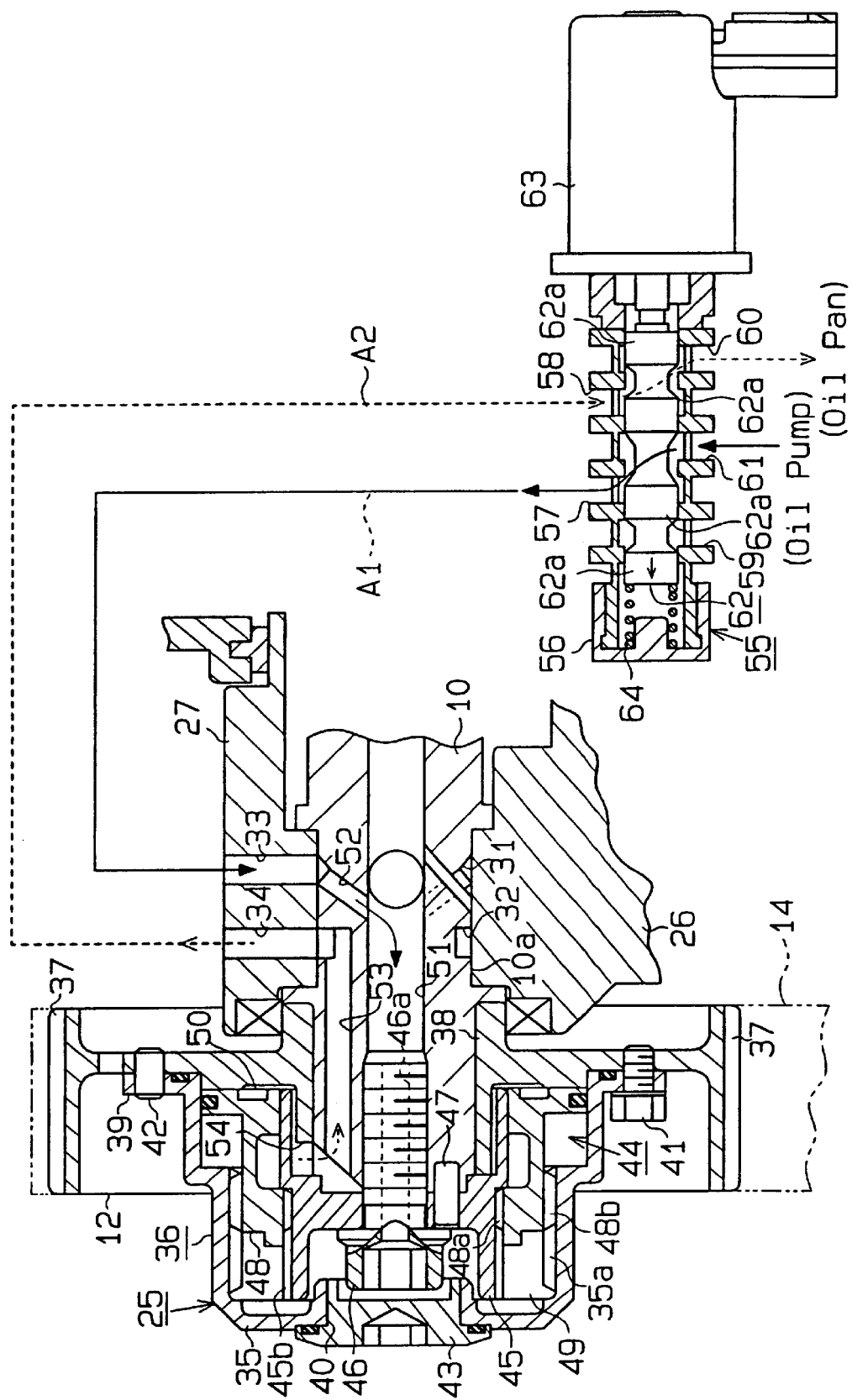
FIG. 3 is a cross-sectional view showing the structures of the VVT mechanism and the LSV.

FIGS. 2 and 3 show the structure of the VVT mechanism 25 and a linear solenoid valve (LSV) 55, which adjusts the movement of the VVT mechanism 25. A camshaft 10 has a journal 10a, which is rotatably supported between a cylinder head 26 and a bearing cap 27 of the engine 1. Two oil grooves 31, 32 extend along the circumferential surface of the journal 10a. Oil passages 33, 34 are provided in the bearing cap 27 and are connected to the oil grooves 31, 32, respectively.

As shown in FIG. 1, the engine 1 is further provided with an oil pan 28, an oil pump 29, and an oil filter 30. The oil pump 29 is driven by the engine 1. When operated, the oil pump 29 draws in oil from the oil pan 28 and then forces out the oil. The oil passes through the oil filter 30 and is selectively forced toward either one of the oil passages 33, 34 and supplied to the associated oil groove 31, 32.

In addition to the timing pulley 12, the VVT mechanism 25 includes a cover 35, an inner cap 45, and a ring gear 48. A housing 36 is constituted by the generally disk-like timing pulley 12 and the cover 35, which is secured to the pulley 12. The cover 35 encompasses one side of the timing pulley 12 and the distal end of the camshaft 10. Outer teeth 37 project from the circumferential surface of the timing pulley 12. A timing belt 14 is meshed with the teeth 37. A boss 38 is provided at the center of the timing pulley 12. The boss 38 is fitted to the camshaft 10 and supported so as to enable relative rotation between the timing pulley 12 and the camshaft 10.

A flange 39 is provided along the periphery of the cover 35. The flange 39 is fastened to one side of the timing pulley 12 by a plurality of bolts 41 and pins 42. Thus, the cover 35 rotates integrally with the timing pulley 12. A bore 40 is provided at the center of the cover 35. The bore 40 is closed by a cap 43. A plurality of inner teeth 35a are provided on the inner circumferential surface of the cover 35. The inner teeth 35a are helical teeth and have a tooth trace that is diagonal with respect to the axis of the camshaft 10.

The inner cap 45 is fastened to the distal end of the camshaft 10 by a hollow bolt 46 and a pin 47. Helical outer teeth 45b are provided on the circumferential surface of the inner cap 45 in the same manner as the inner teeth 35a of the cover 35.

The ring gear 48 is accommodated in a space 44 encompassed by the inner cap 45 and the housing 44. Inner teeth 48a are provided on the inner circumferential surface of the ring gear 48 while outer teeth 48b are provided on the outer circumferential surface of the ring gear 48. Both inner and outer teeth 48a, 48b are helical teeth. The inner teeth 48a are meshed with the outer teeth 45b while the outer teeth 48b are meshed with the inner teeth 35a of the cover 35. Thus, the rotation of the timing pulley 12 is transmitted to the camshaft 10 by means of the ring gear 48. Movement of the ring gear 48 in the axial direction of the camshaft 10 rotates the timing pulley 12 relatively to the camshaft 10.

The ring gear 48 defines a first hydraulic chamber 49 and a second hydraulic chamber 50 in the space 44. The first hydraulic chamber 49 is located between the left end of the ring gear 48 and the cover 35 while the second hydraulic chamber 50 is located between the right end of the ring gear 48 and the timing pulley 12.

An oil passage 51 extends axially through the camshaft 10. The distal side of the oil passage 51 is communicated with the first hydraulic passage 49 through a bore 46a that extends through the hollow bolt 46. The basal side of the oil passage 51 is communicated with the oil groove 31 through an oil hole 52 extending radially through the camshaft 10. A first pressurizing passage A1, through which oil flows to communicate hydraulic pressure to the first hydraulic chamber 49, is constituted by the oil passage 33, the oil groove 31, the oil hole 52, the oil passage 51, and the bore 46a.

A further oil passage 53, which extends parallel to the oil passage 51, extends through the camshaft 10. The distal side of the oil passage 53 is communicated with the second hydraulic chamber 50 through an oil hole 54 that extends through the boss 38. The basal side of the oil passage 53 is communicated with the oil groove 32. A second pressurizing passage A2, through which oil flows to communicate hydraulic pressure to the second hydraulic chamber 50, is constituted by the oil passage 34, the oil groove 32, the oil passage 53, and the oil hole 54.

The LSV 55 is arranged between the pressurizing passages A1, A2 to control the hydraulic pressure communicated to the hydraulic chambers 49, 50. The LSV 55 will now be described.

The LSV 55 has a casing 56, which includes first, second, third, fourth, and fifth ports 57, 58, 59, 60, 61. The first port 57 is communicated with the oil passage 33 while the second port 58 is communicated with the oil passage 34. The third and fourth ports 59, 60 are each communicated with the oil pan 28. The fifth port 61 is communicated with the oil pump 29 by way of the oil filter 30.

A spool 62 is arranged in the casing 56. The spool 62 includes four cylindrical valve bodies 62a. The valve bodies 62a open and close the ports 57–61 in accordance with the position of the spool 62. This enables the oil passages 33, 34 to be connected to and disconnected from the oil pump 29 and the oil pan 28.

An electromagnetic solenoid 63 is connected to the casing 56 to move the spool 62 between a first position shown in FIG. 2 and a second position shown in FIG. 3. A spring 64 is arranged in the casing 56 to urge the spool 62 toward the first position.

As shown in FIG. 3, when the spool 62 is located at the second position, the oil pump 29 is communicated with the oil passage 33 and the oil pan 28 is communicated with the oil passage 34. Thus, oil is sent into the first hydraulic chamber 49 while oil is sent out of the second hydraulic chamber 50 toward the oil pan 28. As a result, the hydraulic pressure in the first hydraulic chamber 49 moves and rotates the ring gear 48 along the axial direction of the camshaft 10. The movement of the ring gear 48 rotates the camshaft 10 relatively to the housing 36. This advances the rotational phase of the camshaft 10 with respect to the rotational phase of the timing pulley 12 and advances the valve timing of the intake valves 8.

When the LSV 55 maintains the spool 62 at the second position, the ring gear 48 consequently abuts against the timing pulley 12, as shown in FIG. 3. The valve timing of the intake valves 8 is most advanced and the valve overlap is longest when the ring gear 48 is located at this position.

As shown in FIG. 2, when the spool 62 is located at the first position, the oil pump 29 is communicated with the oil passage 34 and the oil pan 28 is communicated with the oil passage 33. Thus, oil is sent into the second hydraulic chamber 50 while oil is sent out of the first hydraulic chamber 49 toward the oil pan 28. As a result, the hydraulic pressure in the second hydraulic chamber 50 moves and rotates the ring gear 48 along the axial direction of the camshaft 10. The movement of the ring gear 48 rotates the camshaft 10 relatively to the housing 36. This retards the rotational phase of the camshaft 10 with respect to the rotational phase of the timing pulley 12 and retards the valve timing of the intake valves 8.

When the LSV 55 maintains the spool 62 at the first position, the ring gear 48 consequently abuts against the stepped portion of the cover 35, as shown in FIG. 2. The valve timing of the intake valves 8 is most retarded and the valve overlap is shortest when the ring gear 48 is located at this position.

The spool 62 may be arranged at an arbitrary position between the first and second positions. The flow rate of the oil supplied to the hydraulic chambers 49, 50 is altered in accordance with the position of the spool 62. The flow rate determines the advancing speed or the retarding speed of the valve timing.

The spool 62 disconnects the oil passages 33, 34 from the oil pump 29 and the oil pan 28 when located at an intermediate position between the first and second positions. At the intermediate position, the spool 62 obstructs the flow of oil to the hydraulic chambers 49, 50 and stops the movement of the ring gear 48. In such state, the varying of the valve timing is stopped.

Figure 5A:
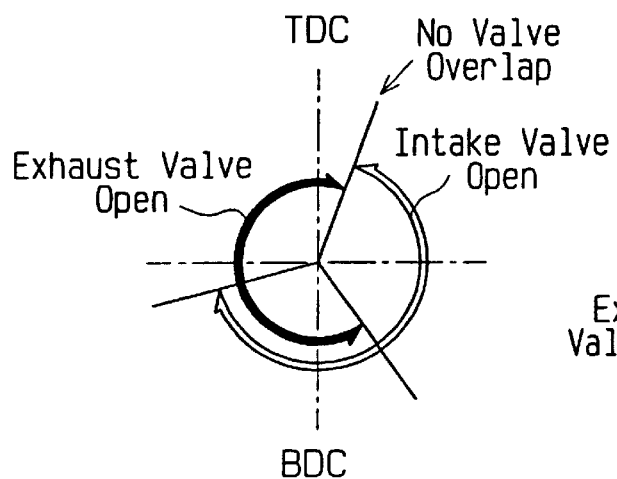
FIGS. 5(*a*) & 5(*b*) are explanatory drawings showing changes in the valve overlap.
Figure 5B:
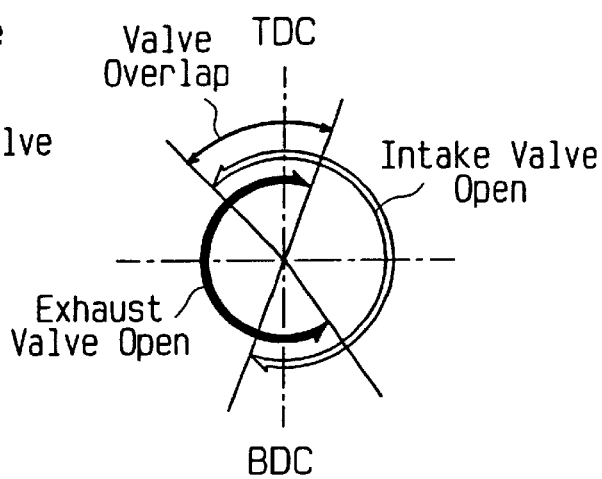

Accordingly, the valve timing of the intake valves 8 and the valve overlap may be varied continuously, that is, in a stepless manner, between the state shown in FIG. 5(a) and the state shown in FIG. 5(b).

An electronic control unit (ECU) 80 outputs a control signal corresponding to a predetermined duty ratio DVT to the electromagnetic solenoid 63 of the LSV 55. The position of the spool 62 is altered by the magnitude of the duty ratio DVT to obtain the desired valve timing.

For example, when the duty ratio DVT is in the range of 0%≦DVT<50%, the spool 62 is arranged between the intermediate position and the first position. This retards the valve timing. If the duty ratio DVT is in the range of 0%<DVT≦50%, the spool 62 is arranged between the intermediate position and the second position. This advances the valve timing. When the duty ratio DVT is set at 50%, the spool 62 is arranged at the intermediate position. This maintains the present valve timing.

The ECU 80, which is installed in the vehicle, will now be described. The ECU 80 receives signals sent from the sensors 71–79. The ECU 80 controls the injectors 16, the ignitor 22, the ISCV 24, and the LSV 55 based on these signals to execute various processings such as fuel injection control, ignition timing control, idle speed control, valve timing control, and detection of abnormalities related to the valve timing control. Abnormalities related to the valve timing control include malfunctioning of the VVT mechanism 25 and the LSV 55.

Figure 4:
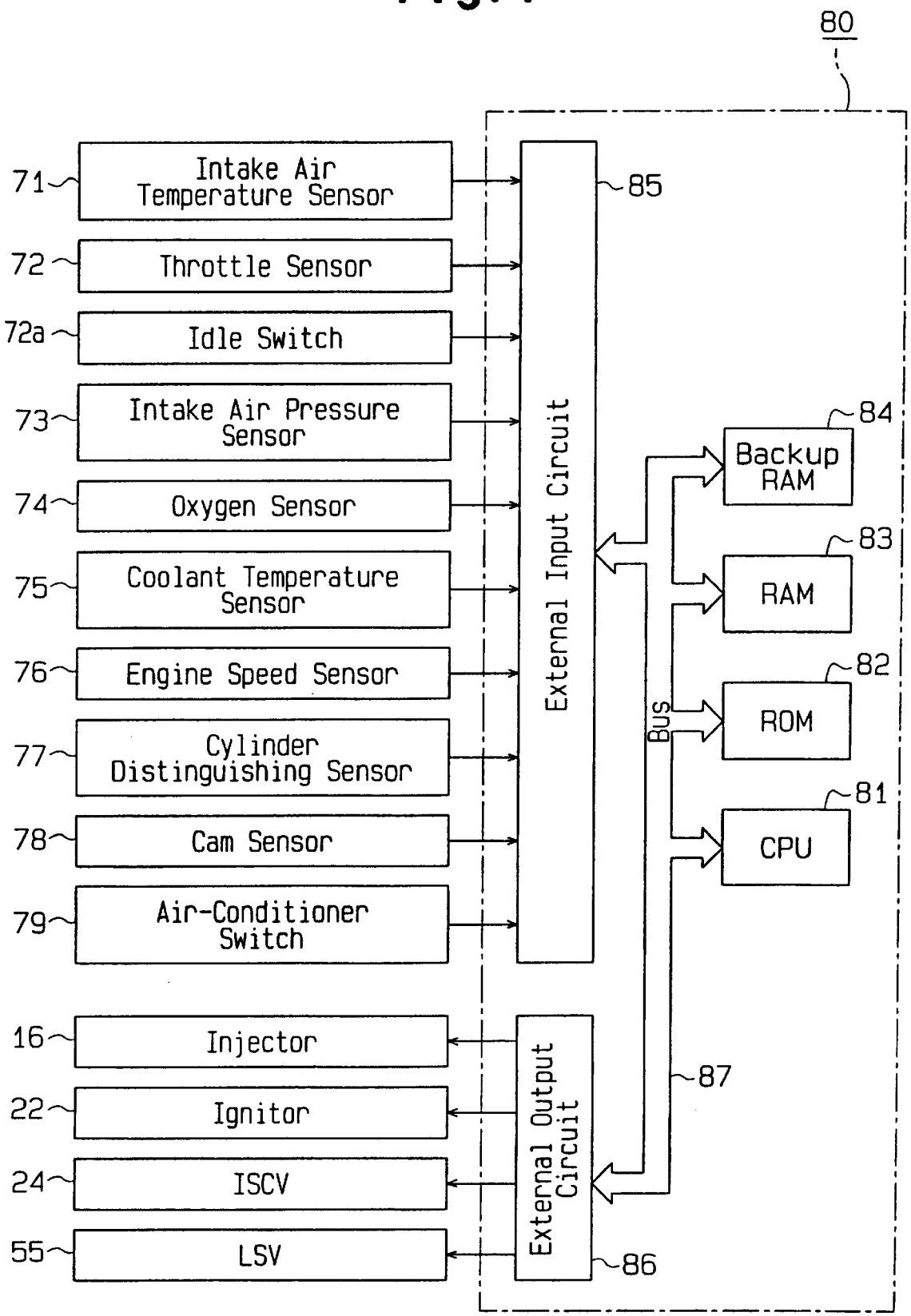

As shown in FIG. 4, the ECU 80 includes a central processing unit (CPU) 81, a read only memory (ROM) 82, a random access memory (RAM) 83, and a backup RAM 84. A bus 87 connects the CPU 81, the ROM 82, the RAM 83, and the backup RAM 84 to an external input circuit 85, which includes an analog to digital converter, and an external output circuit 86. The ROM 82 stores control programs and functional data. The RAM 83 temporarily stores computation results of the CPU 81. The backup RAM 84 stores data even after the engine 1 is stopped. The sensors 71–79 are connected to the external input circuit 85. The injectors 16, the ignitor 22, the ISCV 24, and the LSV 55 are connected to the external output circuit 86.

Figure 7:
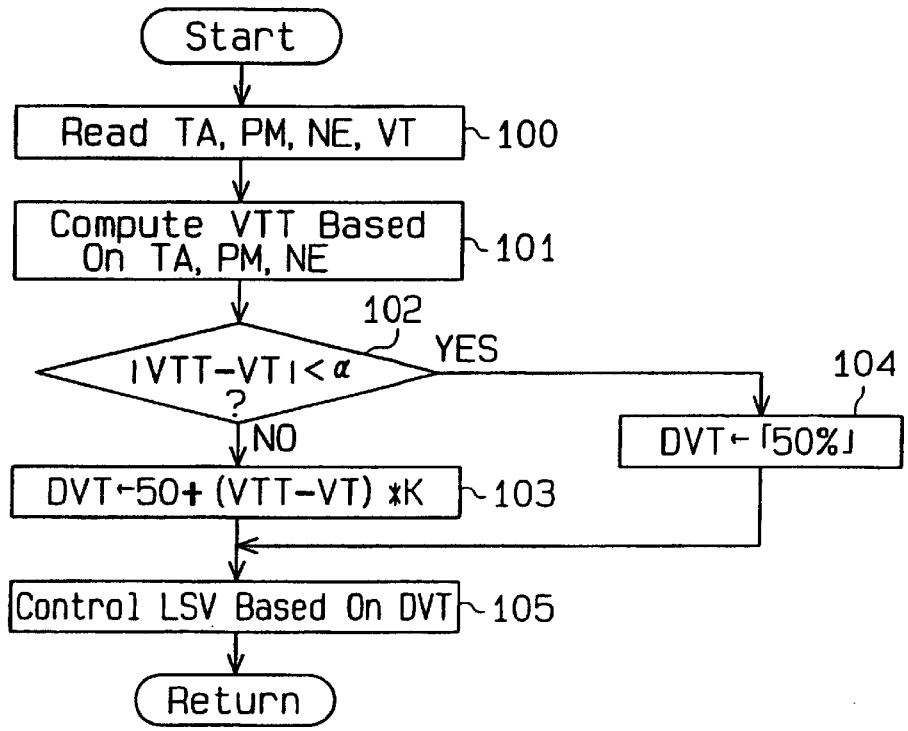
FIG. 7 is a flowchart showing the valve timing control routine.

The valve timing control routine will now be described with reference to the flowchart of FIG. 7. Once the engine 1 is started, the CPU 81 executes this routine in a cyclic manner.

At step 100, the CPU 81 reads the throttle angle TA, the intake air pressure PM, the engine speed NE, and the actual displacement angle VT based on the signals sent from the associated sensors 72, 73, 76, 77, 78.

At step 101, the CPU 81 computes the target displacement angle VTT with respect to the actual displacement angle VT based on the parameters TA, PM, and NE. To compute the target displacement angle VTT, the CPU 81 first computes the intake air amount GA from the parameters TA, PM, and NE. The intake air amount GA and the engine speed NE are then used to compute the load GN (=GA/NE). The CPU 81 then computes the target displacement angle VTT from the load GN and the engine speed NE. The CPU 81 stores the computed load GN and the target displacement angle VTT in the RAM 83.

The ROM 82 stores functional data, which is used to obtain the target displacement angle VTT from the relationship between the load GN and the engine speed NE. The CPU 81 refers to the functional data when computing the target displacement angle VTT.

Figure 6:
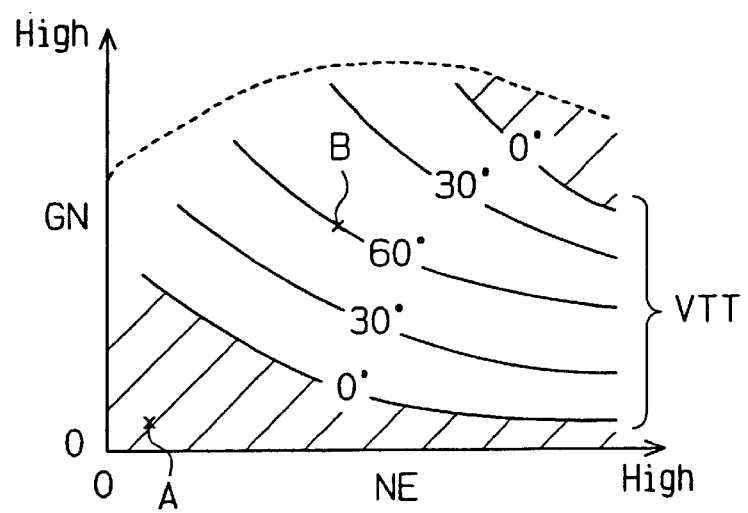
FIG. 6 is a graph showing the relationship between the load and the engine speed with respect to the target displacement angle.

FIG. 6 is a graph showing the functional data. The area marked by slanted lines corresponds to the range in which the target displacement angle VTT is zero degrees. When the target displacement angle VTT is in this range and the actual displacement angle VT coincides with the target displacement angle VTT, there is no valve overlap. For example, if the engine 1 is idling (e.g., the state indicated by point A in FIG. 6), the target displacement angle VTT is set at zero degrees.

When the load of the engine 1 becomes high (e.g., the state indicated by point B in FIG. 6), the target displacement angle VTT is set at sixty degrees. The period of valve overlap is longest when the actual displacement angle VT coincides with this target displacement angle VTT (sixty degrees).

At step 102, the CPU 81 determines whether the absolute deviation |VTT−VT| of the target displacement angle VTT and the actual displacement angle VT is smaller than a predetermined judgement value $\alpha$. The judgement value $\alpha$ is a value used to determine whether the valve timing suits the operating state of the engine 1. In this embodiment, the judgement value $\alpha$ is set at three degrees.

If it is determined that the absolute deviation |VTT−VT| is smaller than the judgement value $\alpha$, the CPU 81 proceeds to step 104. At step 104, the CPU 81 sets the duty ratio DVT at 50%.

If it is determined that the absolute deviation |VTT−VT| is not smaller than the judgement value $\alpha$ in step 102, the CPU 81 proceeds to step 103. At step 103, the CPU 81 computes the duty ratio DVT from the following equation.

$$DVT=50+(VTT-VT)*K \qquad (1)$$

In the equation, K represents a proportional constant.

After carrying out steps 103 or 104, the CPU 81 proceeds to step 105 and sends a control signal corresponding to the duty ratio DVT to the LSV 55. This controls the LSV 55.

Accordingly, the present state of the actual displacement angle VT is maintained if the absolute deviation |VTT−VT| is smaller than the judgement value $\alpha$. If the absolute deviation |VTT−VT| is equal to or greater than the judgement value $\alpha$, the actual displacement angle VT is altered so as to decrease the deviation between the target displacement angle VTT and the actual displacement angle VT. The CPU 81 temporarily terminates this routine after carrying out step 105.

Figure 8:
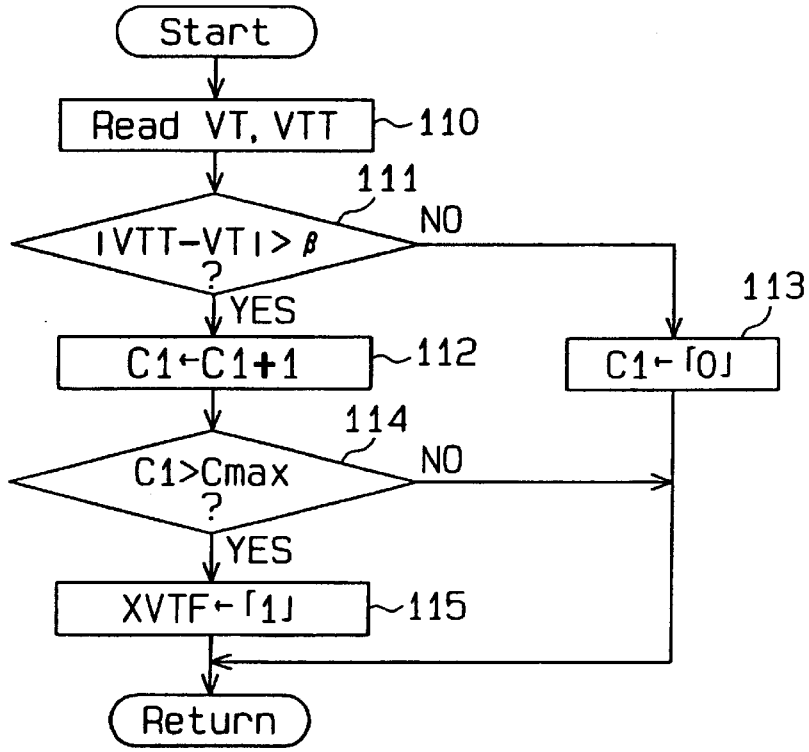
FIG. 8 is a flowchart showing the routine for detecting abnormalities related to the valve timing control.

The routine for detecting abnormalities related to the valve timing control will now be described with reference to the flowchart of FIG. 8. Once the engine 1 is started, the CPU 81 executes this routine in a cyclic manner.

At step 110, the CPU 81 reads the actual displacement angle VT and the target displacement angle VTT stored in the RAM 83.

At step 111, the CPU 81 determines whether the absolute deviation |VTT−VT| of the target displacement angle VTT and the actual displacement angle VT is greater than a predetermined judgement value $\beta$. The judgement value $\beta$ is a value used to determine whether the valve timing control is being executed properly. In this embodiment, the judgement value $\beta$ is set at twenty degrees.

If it is determined that the absolute deviation |VTT−VT| is not greater than the judgement value $\beta$, the CPU 81 determines that there is an abnormality in the valve timing control and proceeds to step 113. At step 113, the CPU 81 sets the counter value C1 at zero. The counter value C1 changes in accordance with the time that elapses after the absolute deviation |VTT−VT| becomes greater than the judgement value $\beta$. After carrying out step 113, the CPU 81 temporarily terminates this routine.

If it is determined that the absolute deviation |VTT−VT| is greater than the judgement value $\beta$ in step 111, there is a possibility of an abnormality such as the ring gear 48 being stuck and the responsiveness of the ring gear 48 being drastically low. In this case, the CPU 81 proceeds to step 112.

At step 112, one is added to the present counter value C1 in an increment manner.

At step 114, the CPU 81 determines whether the counter value C1 is greater than a judgement value Cmax. The judgement value Cmax is a value that corresponds to the time necessary to judge abnormality of the VVT mechanism 25. In this embodiment, the judgement value Cmax is set at a value corresponding to ten seconds.

If the count value C1 is not greater than the judgement value Cmax, this indicates that the time necessary to judge abnormality of the VVT mechanism 25 has not yet elapsed. In this case, the CPU 81 temporarily terminates the routine.

If the count value C1 is greater than the judgement value Cmax in step 114, the CPU 81 determines that there is an abnormality in the VVT mechanism 25 and proceeds to step 115.

At step 115, the CPU 81 sets the abnormality flag XVTF to one. The abnormality flag XVTF indicates that there is an abnormality in the VVT mechanism 25. After carrying out step 115, the CPU 81 temporarily terminates this routine.

Accordingly, in this routine, if a predetermined time period (ten seconds) elapses with the absolute deviation |VTT−VT| maintained in a state greater than the judgement value $\beta$, it is determined that there is an abnormality in the VVT mechanism 25 and the abnormality flag XVTF is set at one.

Figure 9:
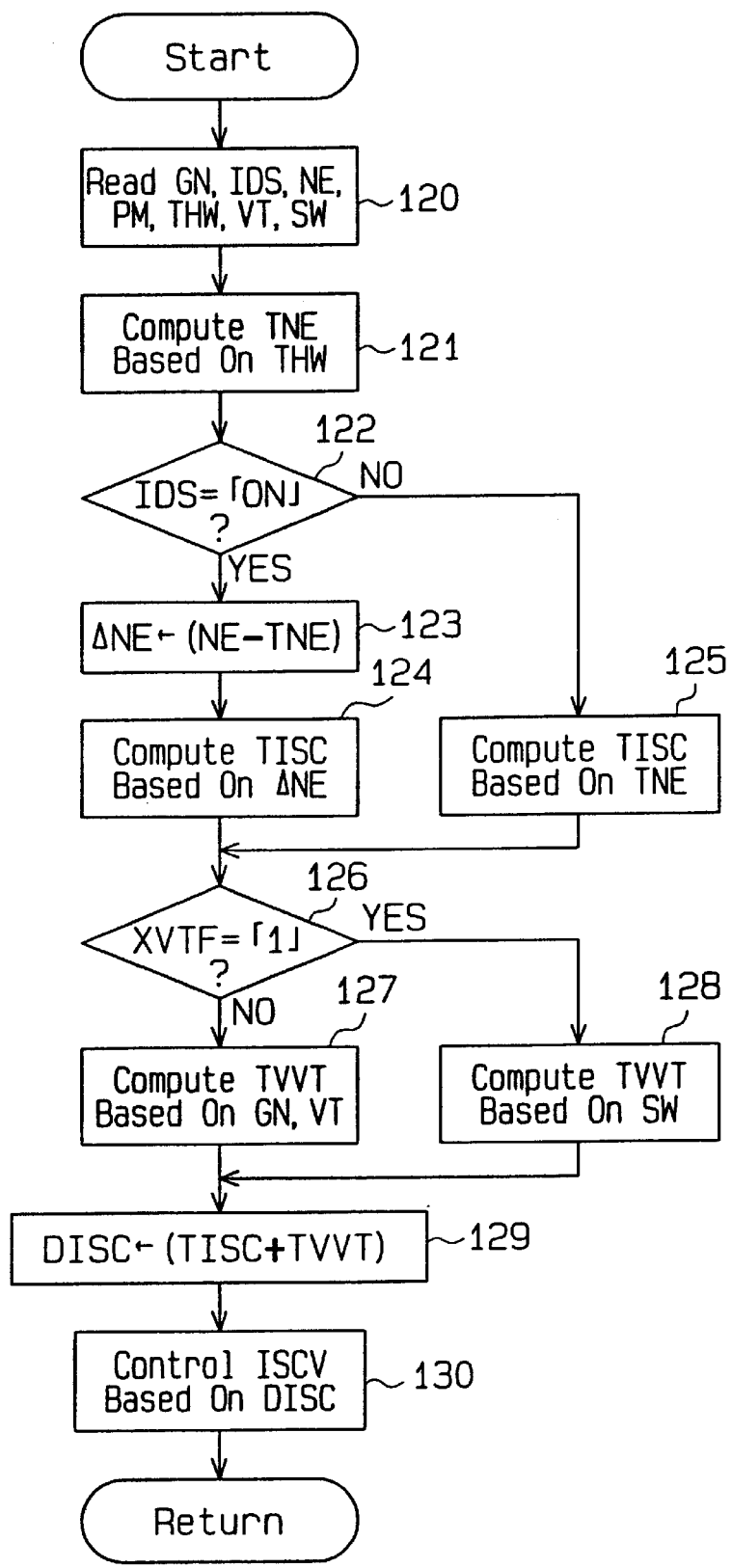
FIG. 9 is a flowchart showing the ISCV control routine.

The ISCV control routine will now be described with reference to the flowchart of FIG. 9. Once the engine 1 is started, the CPU 81 executes this routine in a cyclic manner.

At step 120, reads the idle switch signal IDS, the engine speed NE, the intake air pressure PM, the coolant temperature THW, the actual displacement angle VT, the switch signal SW based on the detecting signals sent from the associated sensors 72a, 73, 75, 76, 78, 79. The CPU 81 further refers to the RAM 83 to read the load GN.

At step 121, the CPU 81 computes the target engine speed TNE, which is the target value of the engine speed NE when the engine 1 is idling. The ROM stores functional data that defines the relationship between the coolant temperature THW and the target engine speed TNE. The CPU 81 refers to the functional data when computing the target engine speed TNE.

At step 122, the CPU 81 determines whether the idle switch signal IDS is set at ON. If the idle switch signal IDS is set at ON, the engine 1 is idling. In this case, the CPU 81 proceeds to step 123.

At step 123, the CPU 81 computes the deviation $\Delta NE (= NE - TNE)$ between the engine speed NE and the target engine speed TNE.

At step 124, the CPU 81 computes the basic opening degree TISC of the ISCV 24 based on the deviation $\Delta NE$.

If the idle switch signal IDS is not set at ON in step 122, this indicates that the engine 1 is not idling. In this case, the CPU 81 proceeds to step 125.

At step 125, the CPU 81 computes the basic opening degree TISC based on the target engine speed TNE. The CPU 81 proceeds to step 126 after carrying out either step 125 or step 124.

At step 126, the CPU 81 determines whether the abnormality flag XVTF is set at one. If the abnormality flag XVTF is not set at one, the CPU 81 determines that there is no abnormality in the VVT mechanism 25 and proceeds to step 127.

At step 127, the CPU 81 computes the opening correction value TVVT based on the load GN and the actual displacement angle VT. The opening correction value TVVT is added to the basic opening degree TISC to increase the intake air amount. The ROM 82 stores functional data, which is used to obtain the opening correction value TVVT from the relationship between the load GN and the actual displacement angle VT. The CPU 81 refers to the functional data when computing the opening correction value TVVT.

Figure 10:
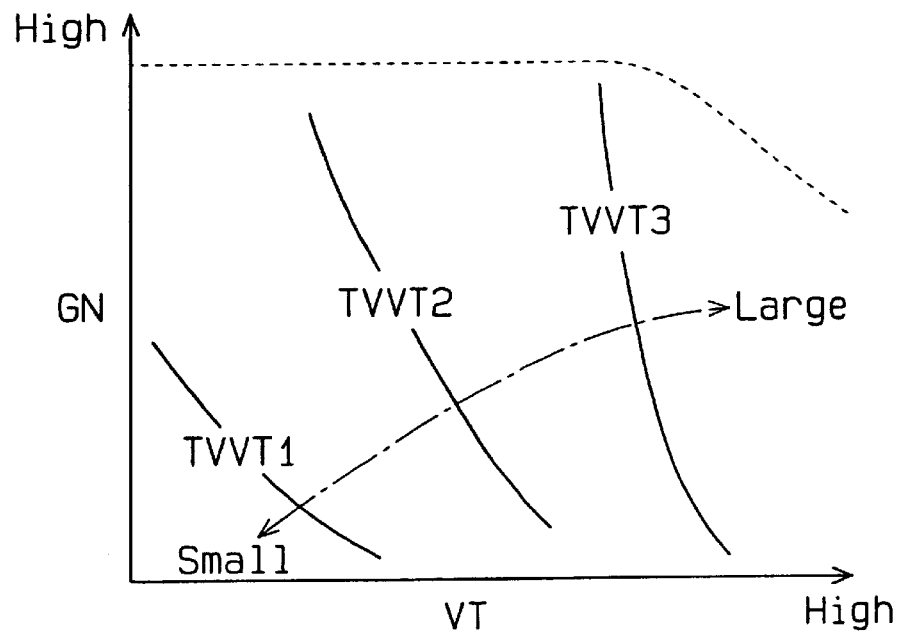
FIG. 10 is a graph showing the relationship between the load and the actual displacement angle with respect to the opening correction value.

FIG. 10 is a graph showing the functional data. The functional data indicates the relationship between the load GN and the actual displacement angle VT with respect to the opening correction value TVVT. The opening correction value TVVT increases as the actual displacement angle VT, or the valve overlap, increases (TVVT1<TVVT2<TVVT3). Furthermore, the opening correction value TVVT increases as the load GN increases.

If it is determined that the abnormality flag XVTF is set at one in step 128, there is an abnormality in the VVT mechanism 25. In this case, the CPU 81 proceeds to step 128.

At step 128, the CPU 81 computes the opening correction value TVVT based on the ON/OFF state of the switch signal SW. If there is an abnormality in the VVT mechanism 25, an insufficient amount of intake air may cause the engine 1 to stall when idling. Therefore, in step 128, the CPU 81 computes the opening correction value TVVT so that it becomes relatively greater than the opening correction value TVVT computed in step 127. Furthermore, if the switch signal SW is set at ON, the load of the engine 1 is large. In this case, the opening correction value TVVT computed by the CPU 81 in step 128 is greater than that computed when the switch signal SW is set at OFF.

The CPU 81 proceeds to step 129 from either steps 127, 128. At step 129, the CPU 81 adds the opening correction value TVVT to the basic opening degree TISC to compute the final opening degree DISC.

At step 130, the CPU 81 controls the opening degree of the ISCV 24 by outputting a control signal based on the duty ratio that corresponds to the final opening degree DISC. As a result, the amount of air that passes through the bypass 23 is adjusted in accordance with the final opening degree DISC. After carrying out step 130, the CPU 81 temporarily terminates this routine.

As described above, the opening correction value TVVT is computed in accordance with the actual displacement angle VT, or the time length of the valve overlap, in addition to the load GN. Furthermore, the basic opening degree TISC is increased by the opening correction value TVVT.

Accordingly, when the engine 1 shifts from an idling state to an accelerating state, the opening degree of the ISCV increases gradually as the load GN and the actual displacement angle VT increases. Thus, the amount of air that passes through the bypass 23 does not increase in an abrupt manner. As a result, there are no sudden changes in the output torque and driveability is thus improved.

Failure of the VVT mechanism 25 or a sudden delay in the responsiveness of the VVT mechanism 25 results in the actual displacement angle VT differing greatly from the desired angle when the engine 1 returns to an idling state. In this case, the opening degree of the ISCV 24 is set in accordance with the actual displacement angle VT, which does not change, and decreased when the load GN decreases. Accordingly, the amount of air necessary to maintain stable idling is obtained through the bypass 23 even if the valve overlap is excessively long when the engine 1 shifts to an idling state. This positively prevents engine stalls that are caused by abnormalities in the VVT mechanism 25.

If the driver decreases the depression degree of the acceleration pedal 90 and shifts the engine 1 to a decelerating state, the opening degree of the ISCV 24 decreases as the load GN decreases. As a result, deceleration is not hindered and the effectiveness of the engine brake is maintained even when there is an abnormality in the VVT mechanism 25.

Abnormalities of the VVT mechanism 25 are confirmed when a predetermined time elapses after the absolute deviation $|VTT-VT|$ becomes greater than the judgement value $\beta$. If it is determined that there is an abnormality of the VVT mechanism 25, the opening degree of the ISCV 24 is increased in comparison to that when there are no abnormalities. This further positively prevents engine stalls when the engine 1 is idling.

Furthermore, if the switch signal SW is set at ON, that is, when the air-conditioning apparatus is switched on, the opening degree of the ISCV 24 is further increased. Accordingly, engine stalls are positively prevented even if the load GN increases.

Figure 12:
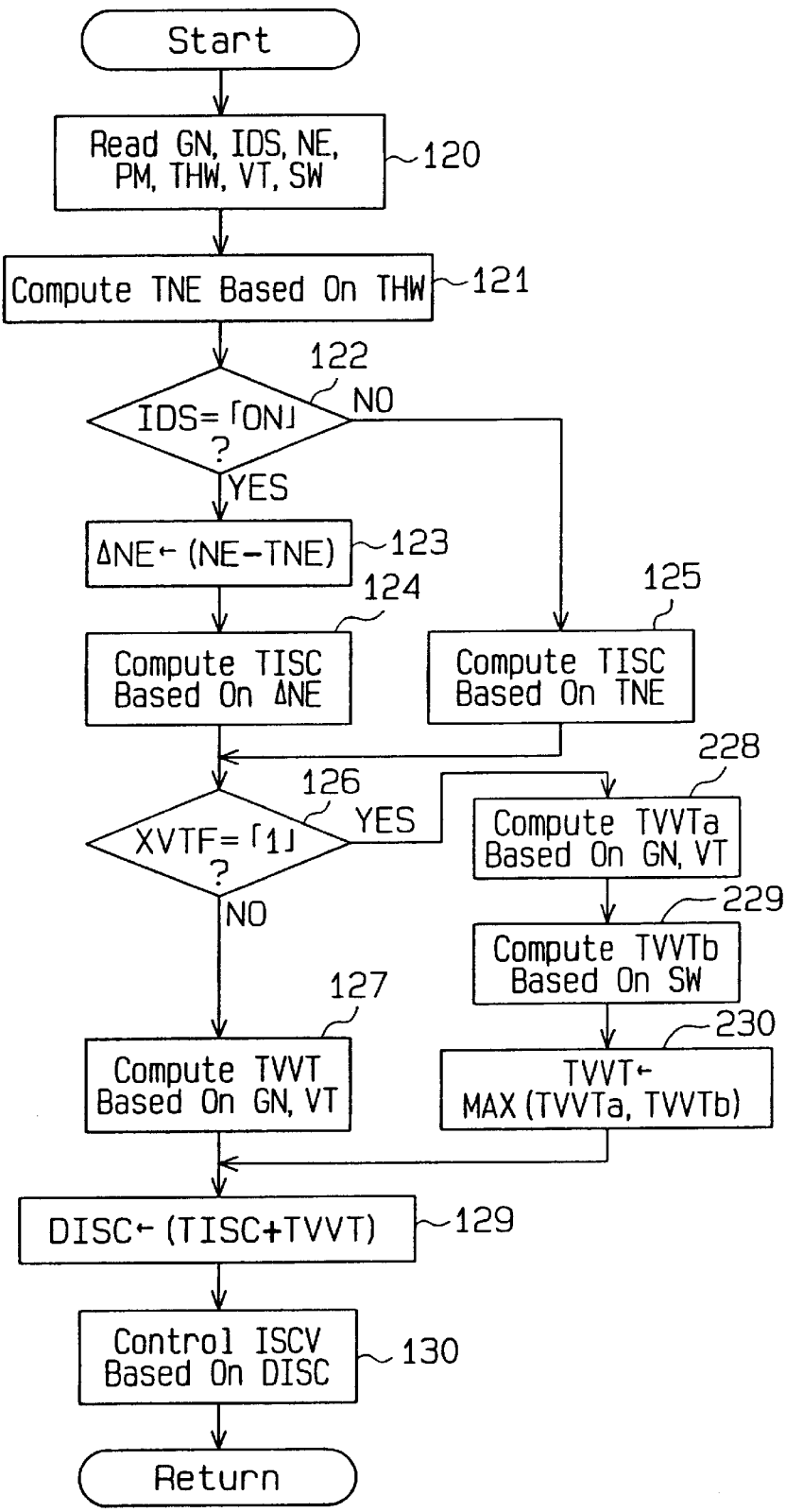
FIG. 12 is a flowchart showing the ISCV control routine employed in a second embodiment according to the present invention.

A second embodiment according to the present invention will now be described with reference to FIG. 12. To avoid a redundant description, like or same reference numerals are given to those components that are like or the same as the corresponding components of the first embodiment.

In the second embodiment, part of the ISCV control routine differs from that of the first embodiment. FIG. 12 shows a flowchart of the ISCV routine. In this routine, the contents of the processing carried out in steps 120–127, 129, and 130 are identical to that of the steps denoted with the same reference numerals in the ISCV control routine of the first embodiment. In this embodiment, steps 228–230 differ from the first embodiment.

If it is determined that the abnormality flag XVTF is set at one in step 126, the CPU 81 proceeds to step 228. At step 228, the CPU 81 computes the opening correction value TVVTa based in the load GN and the actual displacement angle VT.

At step 229, the CPU 81 computes the opening correction value TVVTb based on the switch signal SW. If the switch signal SW is set at ON, the load GN applied to the engine 1 is high. In this case, the CPU 81 obtains a higher opening correction value TVVTb.

At step 230, the CPU 81 compares the opening correction value TVVTa obtained in step 228 and the opening correction value TVVTb obtained in step 229 and selects the larger value. The larger value is set as the opening correction value TVVT. The CPU 81 proceeds to step 129 after carrying out either step 127 or step 230. After carrying out step 230, the CPU 81 proceeds to steps 129, 130.

As described above, the larger one of the opening correction values TVVTa, TVVTb is selected and added to the basic opening degree TISC. Accordingly, the advantageous effects of the first embodiment are also obtained in this embodiment. Furthermore, engine stalls, which are caused by abnormalities in the VVT mechanism 25, are further positively prevented.

Figure 11:
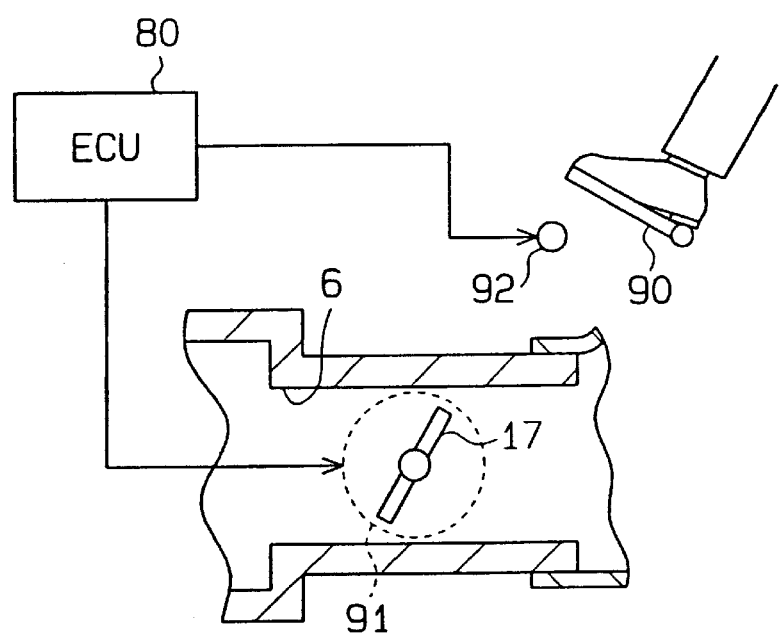
FIG. 11 is a diagrammatic view showing the structure of the throttle valve employed in a third embodiment according to the present invention.
Figure 13:
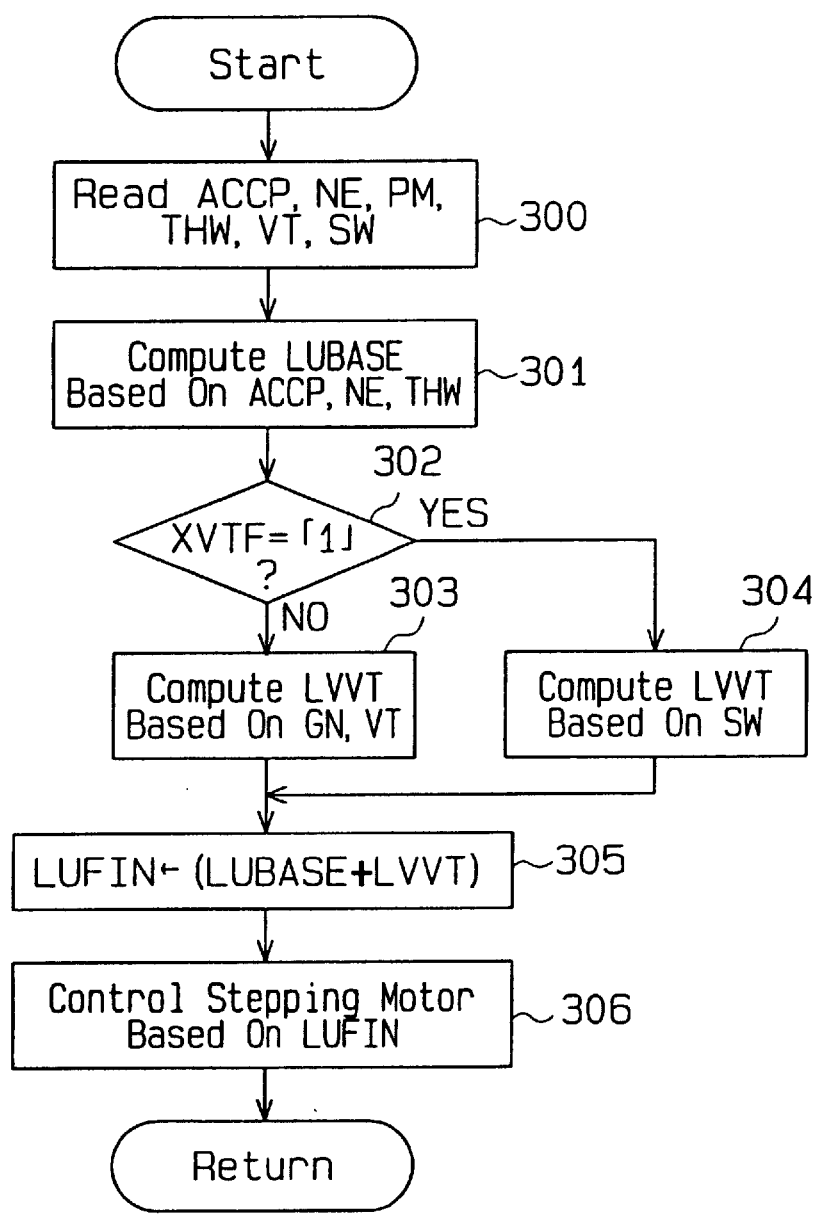
FIG. 13 is a flowchart showing the intake air amount control routine employed in the third embodiment.

A third embodiment according to the present invention will now be described with reference to FIGS. 11 and 13. In the above embodiments, the amount of intake air is adjusted by the ISCV 24 when the throttle valve 17 is fully closed during idling of the engine 1. However, in the third embodiment, the ISCV 24 and the bypass 23 are not employed, as shown in FIG. 11. The throttle valve 17 is not mechanically connected to the acceleration pedal 90 like in the first embodiment. In this embodiment, the opening degree (throttle angle TA) of the throttle valve 17 is adjusted by a stepping motor 91, which is arranged in the intake passage 6. In other words, an electronic throttle control system is employed in this embodiment.

An acceleration sensor 92 is arranged in the vicinity of the acceleration pedal to detect the depressed amount of the acceleration pedal 90, or the acceleration degree ACCP. The acceleration sensor 92 sends a signal, which corresponds to the detected acceleration angle ACCP, to the external input circuit 85 of the ECU 80. The CPU 81 controls the stepping motor 91 based on the acceleration angle ACCP, the engine speed NE, and other parameters.

The intake air amount control routine employed in this embodiment will now be described with reference to the flowchart of FIG. 13. Once the engine 1 is started, the CPU 81 executes this routine in a cyclic manner.

At step 300, the CPU 81 reads the acceleration angle ACCP, the engine speed NE, the intake air pressure PM, the coolant temperature THW, the actual displacement angle VT, and the switch signal SW.

At step 301, the CPU 81 computes the basic throttle angle LUBASE of the throttle angle TA based on the acceleration angle ACCP, the engine speed NE, and the coolant temperature THW. The ROM 82 stores functional data that defines the relationship between the acceleration angle ACCP and the engine speed NE with respect to the basic throttle angle LUBASE. The CPU 81 refers to the functional data to obtain the basic throttle angle LUBASE.

The processing carried out in steps 302, 303, 304 is similar to that carried out in steps 126, 127, 128 of the first embodiment (ISCV control routine). The throttle correction angle LVVT is computed through steps 302–304.

At step 305, the throttle correction angle LVVT is added to the basic throttle angle LUBASE. The obtained value is set as the final throttle angle LUFIN. At step 306, the CPU 81 controls the stepping motor 91 to coincide the throttle angle TA with the final throttle angle LUFIN. After carrying out step 306, the CPU 81 temporarily terminates this routine.

This embodiment differs from the first embodiment in that the amount of intake air necessary to prevent engine stalls is ensured by controlling the throttle angle TA. Otherwise, the advantageous effects of this embodiment are the same as the first embodiment.

Figure 14:
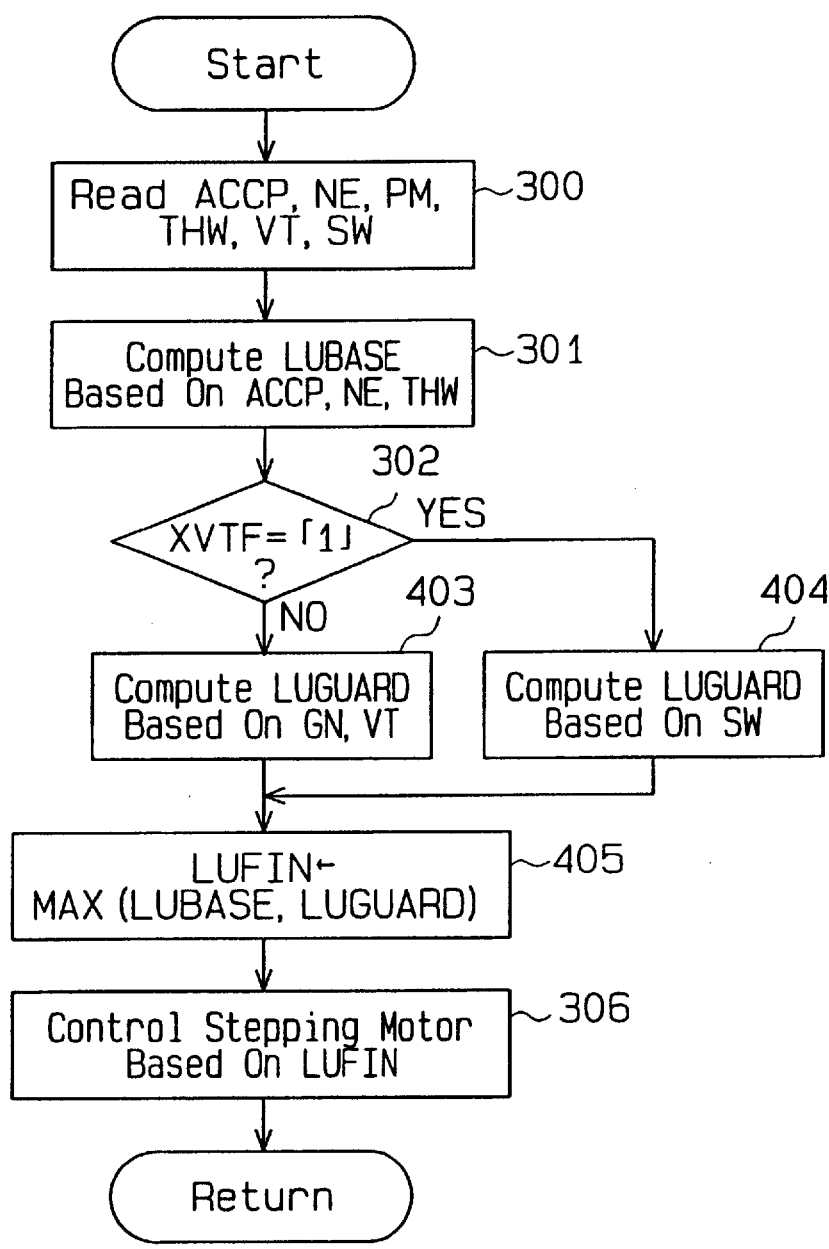
FIG. 14 is a flowchart showing the intake air amount control routine employed in a fourth embodiment according to the present invention.
Figure 15:
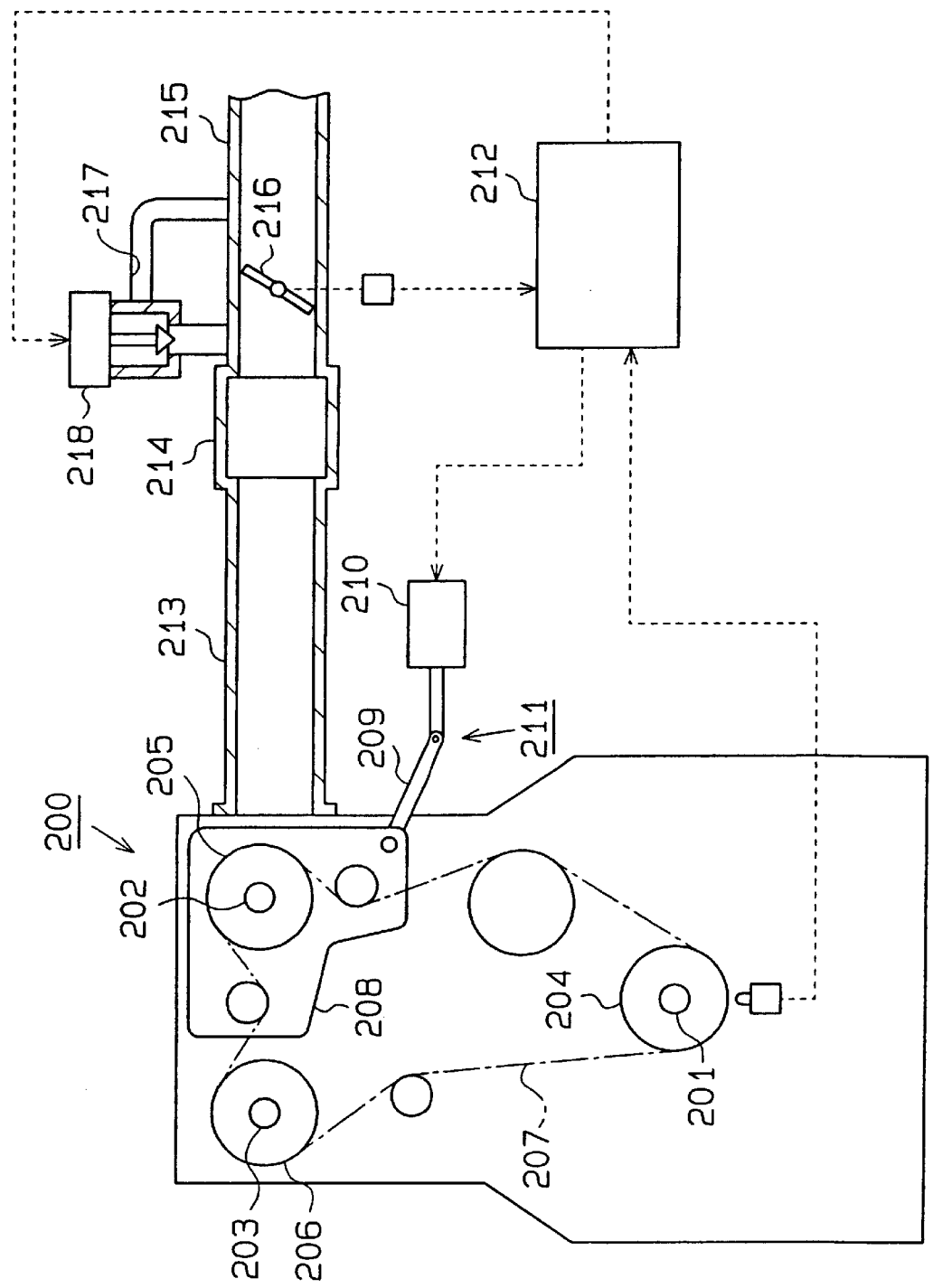
FIG. 15 is a diagrammatic view showing a prior art intake air control apparatus.
Figure 16A:
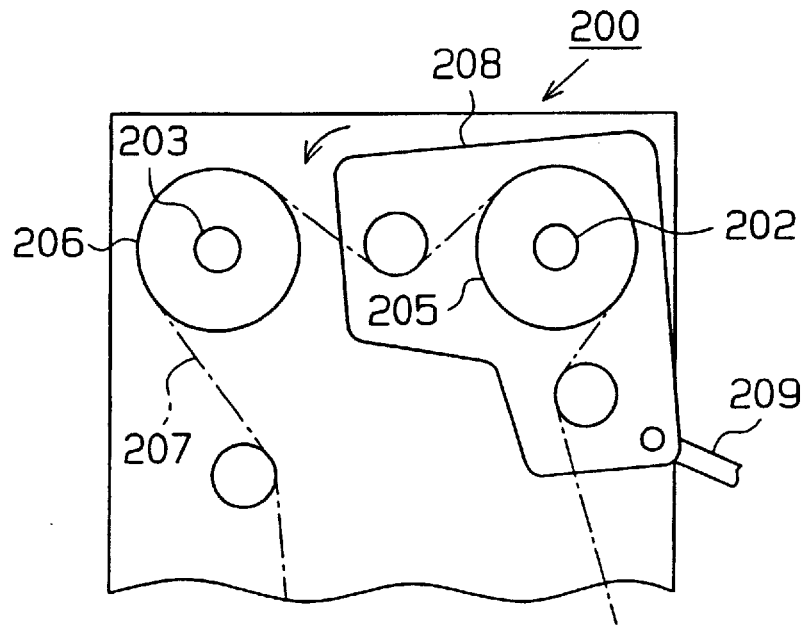
FIGS. 16(*a* & *b*) are diagrammatic views showing the movement of the control plate in the prior art intake air control apparatus.
Figure 16B:
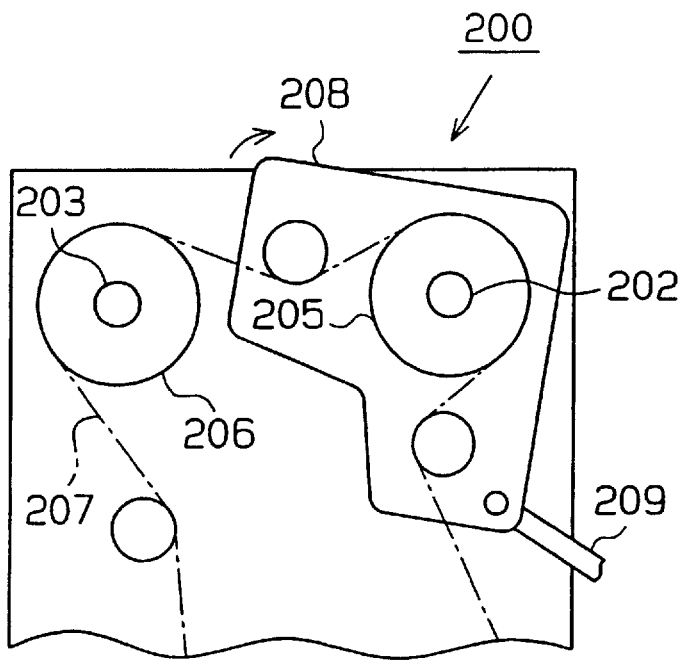

A fourth embodiment according to the present invention will now be described with reference to FIG. 14. This embodiment employs an electronic throttle control system similar to that of the third embodiment.

The intake air amount control routine employed in this embodiment will now be described with reference to the flowchart of FIG. 14. Once the engine 1 is started, the CPU 81 executes this routine in a cyclic manner. In this routine, the contents of the processing carried out in steps 300–302 and 306 are identical to that of the steps denoted with the same reference numerals in the intake air amount control routine of the third embodiment. In this embodiment, steps 403–405 differ from the third embodiment.

If it is determined that the abnormality flag XVTF is not set at one in step 302, there are no abnormalities in the VVT mechanism 25. In this case, the CPU 81 proceeds to step 403. At step 403, the CPU 81 computes the minimum throttle angle LUGUARD based on the load GN and the actual displacement angle VT. The minimum throttle angle LUGUARD corresponds to the minimum angle of the throttle valve 17. The ROM 82 stores functional data that define the relationship between the load GN and the actual displacement angle VT with respect to the minimum throttle angle LUGUARD. The CPU 81 refers to the functional data to obtain the minimum throttle angle LUGUARD.

If it is determined that the abnormality flag XVTF is set at one in step 302, there is an abnormality in the VVT mechanism 25. In this case, the CPU 81 proceeds to step 404. At step 404, the CPU 81 computes the minimum throttle angle LUGUARD based on the switch signal SW. Due to the abnormality in the VVT mechanism 25, insufficient amount of intake air may cause engine stalls when the engine 1 is idling. Furthermore, if the air conditioner switch is switched on, the load GN applied to the engine 1 is great. Thus, the value of the minimum throttle angle LUGUARD computed in step 404 is greater than that computed in step 403.

The CPU 81 proceeds to step 405 from either step 403 or step 404. At step 405, the CPU 81 compares the basic throttle angle LUBASE and the minimum throttle angle LUGUARD and selects the larger value. The larger value is set as the final throttle angle LUFIN.

At step 306 the CPU 81 controls the stepping motor 91 based on the final throttle angle LUFIN. The CPU 81 temporarily terminates this routine after carrying out step 306.

In this embodiment, the basic throttle angle LUBASE and the minimum throttle angle LUGUARD are compared and the larger value is set as the final throttle angle LUFIN. Otherwise, the advantageous effects of this embodiment are the same as the third embodiment.

It should be apparent to those skilled in the art that the present invention may be embodied in many other specific forms without departing from the spirit or scope of the invention. More particularly, the above embodiments may be modified as described below.

In the above embodiments, the opening correction values TVVT, TVVTa, TVVTb, LVVT and the minimum throttle angle LUGUARD are computed from the load GN and the actual displacement angle VT. However, the opening correction values TVVT, TVVTa, TVVTb, LVVT and the minimum throttle angle LUGUARD may be computed from only the actual displacement angle VT. In addition to the actual displacement angle VT, the opening correction values TVVT, TVVTa, TVVTb, LVVT and the minimum throttle angle LUGUARD may be computed from parameters that indicate the state of the load applied to the engine 1 other than the load GN, such as the intake air pressure PM, the throttle angle TA, and the acceleration angle ACCP.

The range of the valve overlap is not restricted to the range described in the above embodiments. Furthermore, the structure of the VVT mechanism 25 is not restricted to the structure described in the above embodiments. For example, a rotary type VVT mechanism may be employed.

In the above embodiments, abnormalities of the VVT mechanism 25 are confirmed (step 126 and step 306). If there are abnormalities, the opening correction value TVVT is computed accordingly (steps 128, 228–230, 304, and 404).

However, the steps related with the determination of abnormalities may be eliminated (steps 126, 128, 228–230, 302, 304, and 404).

In the above embodiments, if abnormalities of the VVT mechanism 25 are detected, the opening correction value TVVT and other similar parameters are computed based on the switch signal SW. However, the opening correction value TVVT and other similar parameters may be set at a constant value.

In the above embodiments, the period of the valve overlap is changed by shifting the valve timing of only the intake valves 8 with the VVT mechanism 25. However, a VVT mechanism may be installed on the camshaft 11 for the exhaust valves 9 to shift the valve timing of only the exhaust valves. This also enables the valve overlap to be changed. As another option, a VVT mechanism may be provided on both camshafts 10, 11 to shift the valve timing of both the intake valves 8 and the exhaust valves 9. This also enables changes in the valve overlap.

In the first embodiment, the opening correction value TVVT is added to the basic opening degree TISC to compute the final opening degree DISC. However, the final opening degree DISC may be obtained by first computing the minimum opening degree of the basic opening degree TISC based on the actual displacement angle VT and the load GN and then selecting the larger value among the minimum opening degree and the basic opening degree TISC as the final opening degree DISC.

Therefore, the present examples and embodiments are to be considered as illustrative and not restrictive and the invention is not to be limited to the details given herein, but may be modified within the scope of the appended claims.

What is claimed is:

1. An apparatus for controlling supply of airflow to an engine, said engine including a combustion chamber connected to an air intake passage and an air exhaust passage, an air intake valve selectively opening and closing the air intake passage to control the supply of the airflow to combustion chamber, an air exhaust valve selectively opening and closing the air exhaust passage to control the discharge of the exhaust gas from combustion chamber, altering means for altering a period of an overlap of the air intake valve and the air exhaust valve by changing a valve timing of at least one of the air intake valve and the air exhaust valve, first detecting means for detecting a driving state of the engine, first computing means for computing a target valve timing based on the detected driving state of the engine and first control means for controlling the altering means based on the computed target valve timing, said apparatus comprising:

adjusting means disposed in the air intake passage to adjust the supply of the airflow to the combustion chamber;

second computing means for computing a target amount of the airflow to be supplied to the engine in an idling state;

second detecting means for detecting the period of the valve overlap;

third computing means for computing a correction value to correct the target amount of the air based on the detected period of the valve overlap, said correction value being continuously variable based on the period of the valve overlap;

correction means for correcting the target amount based on the correction value, correction means increasing the target amount by the correction value; and second control means for controlling the adjusting means based on the corrected target amount.

2. The apparatus as set forth in claim 1, wherein said first detecting means detects a load of engine, and wherein said third computing means computes the correction value based on the detected engine load in addition to the period of the valve overlap.

3. The apparatus as set forth in claim 1, further comprising:

a throttle valve disposed in the air intake passage; and said adjusting means including a bypass passage connected to the air intake passage, said bypass passage connecting portions respectively positioned upstream of and downstream of the throttle valve, and an adjusting valve disposed in the bypass passage, wherein said adjusting valve adjusts the supply of the airflow with its variable opening.

4. The apparatus as set forth in claim 1, wherein said adjusting means includes a throttle valve disposed in the air intake passage.

5. The apparatus as set forth in claim 1, further including:

third detecting means for detecting malfunction of the altering means; and said third computing means increasing the correction value when the malfunction is detected.

6. The apparatus as set forth in claim 5, wherein said third detecting means includes:

means for detecting an actual valve timing; and means for determining the malfunction based on a difference between the actual valve timing and the target valve timing.

7. The apparatus as set forth in claim 5, wherein said third detecting means includes:

means for detecting an actual valve timing; and means for calculating a difference between the actual valve timing and the target valve timing; and means for determining the malfunction when the calculated difference is greater than a predetermined value.

8. The apparatus as set forth in claim 5, wherein said third detecting means includes:

means for detecting an actual valve timing; and means for calculating a difference between the actual valve timing and the target valve timing; and means for counting a time lapse after the calculated difference becomes greater than a predetermined value; and means for determining the malfunction when the counted time lapse is greater than a predetermined value.

9. An apparatus for controlling supply of airflow to an engine, said engine including a combustion chamber connected to an air intake passage and an air exhaust passage, an air intake valve selectively opening and closing the air intake passage to control the supply of the airflow to combustion chamber, an air exhaust valve selectively opening and closing the air exhaust passage to control the discharge of the exhaust gas from combustion chamber, altering means for altering a period of an overlap of the air intake valve and the air exhaust valve by changing a valve timing of at least one of the air intake valve and the air exhaust valve, first detecting means for detecting a driving state of the engine, and first control means for controlling the altering means based on the detected driving state of the engine, said apparatus comprising:

adjusting means for adjusting the supply of the airflow to the combustion chamber;

first computing means for computing a target amount of the airflow to be supplied to the engine in an idling state;

second detecting means for detecting the period of the valve overlap;

second computing means for computing a lowermost value of the target amount based on the detected period of the valve overlap, said lowermost value being continuously variable based on the period of the valve overlap;

correction means for correcting the target amount based on the lowermost value, said correction means setting the target amount to be greater than the lowermost value; and second control means for controlling the adjusting means based on the corrected target amount.

10. The apparatus as set forth in claim 9, wherein said first detecting means detects a load of engine, and wherein said second computing means computes the lowermost value based on the detected engine load in addition to the period of the valve overlap.

11. The apparatus as set forth in claim 9, further comprising:

a throttle valve disposed in the air intake passage; and said adjusting means including a bypass passage connected to the air intake passage, said bypass passage connecting portions respectively positioned upstream of and downstream of the throttle valve, and an adjusting valve disposed in the bypass passage, wherein said adjusting valve adjusts the supply of the airflow with its variable opening.

12. The apparatus as set forth in claim 9, wherein said adjusting means includes a throttle valve disposed in the air intake passage.

13. The apparatus as set forth in claim 9, further including:

third detecting means for detecting malfunction of the altering means; and said second computing means increasing the correction value when the malfunction is detected.

14. The apparatus as set forth in claim 13, wherein said third detecting means includes:

means for detecting an actual valve timing; and means for determining the malfunction based on a difference between the actual valve timing and the target valve timing.

15. The apparatus as set forth in claim 13, wherein said third detecting means includes:

means for detecting an actual valve timing; and means for calculating a difference between the actual valve timing and the target valve timing; and means for determining the malfunction when the calculated difference is greater than a predetermined value.

16. The apparatus as set forth in claim 13, wherein said third detecting means includes:

means for detecting an actual valve timing; and means for calculating a difference between the actual valve timing and the target valve timing; and means for counting a time lapse after the calculated difference becomes greater than a predetermined value; and means for determining the malfunction when the counted time lapse is greater than a predetermined value.

* * * * *